US012583552B2

(12) United States Patent

Meindl et al.

(10) Patent No.: US 12,583,552 B2
(45) Date of Patent: Mar. 24, 2026

(54) ALPINE BICYCLE

(71) Applicant: MICADO SMART ENGINEERING GMBH, Oberlienz (AT)

(72) Inventors: Edwin Meindl, Nikolsdorf (AT); Thomas Rödlach, Lienz (AT); Daniel Auer, Nußdorf-Debant (AT); Simon Mair, Amlach (AT)

(73) Assignee: MICADO SMART ENGINEERINGGMBH, Oberlienz (AT)

( * ) Notice: Subject to any disclaimer, the term of this patent is extended or adjusted under 35 U.S.C. 154(b) by 597 days.

(21) Appl. No.: 18/001,572

(22) PCT Filed: Jun. 11, 2021

(86) PCT No.: PCT/EP2021/065827
§ 371 (c)(1),
(2) Date: Dec. 12, 2022

(87) PCT Pub. No.: WO2021/259678
PCT Pub. Date: Dec. 30, 2021

(65) Prior Publication Data
US 2023/0234667 A1 Jul. 27, 2023

(30) Foreign Application Priority Data

Jun. 25, 2020 (DE) ..................... 10 2020 116 725.3

(51) Int. Cl.
*B62K 15/00* (2006.01)
*B62J 11/13* (2020.01)
(Continued)

(52) U.S. Cl.
CPC ............. *B62K 15/008* (2013.01); *B62J 11/13* (2020.02); *B62J 25/06* (2020.02); *B62K 3/002* (2013.01);
(Continued)

(58) Field of Classification Search
CPC .................................................... B62K 15/008
(Continued)

(56) References Cited

U.S. PATENT DOCUMENTS 3,990,717 A 11/1976 Best
4,202,561 A 5/1980 Yonkers
(Continued)

FOREIGN PATENT DOCUMENTS

AT 409 754 B 11/2002
CN 101784436 A 7/2010
(Continued)

OTHER PUBLICATIONS

Examination Report of German DE 102020116725.3, Jan. 29, 2021, 8 pages.
(Continued)

*Primary Examiner* — Valentin Neacsu
*Assistant Examiner* — Hosam Shabara
(74) *Attorney, Agent, or Firm* — Womble Bond Dickinson (US) LLP

(57) ABSTRACT

A bicycle for driving downhill with a front wheel region, a rear wheel region, and a support rod which couples the front wheel region and the rear wheel region, the support rod having at least one hinge for unfolding and folding and has a front rod portion between the front wheel region and the hinge and a rear rod portion between the rear wheel region and the hinge, a foot rod is pivotably mounted with a coupling portion to the support rod and has a footrest region for resting feet of a user of the bicycle, and the bicycle includes a tension rope system having a first rope tensioning portion and a second rope tensioning portion, wherein the first rope tensioning portion is coupled to the foot portion
(Continued)

and the front rod portion, and the second rope tensioning portion is coupled to the foot portion and the rear rod portion.

20 Claims, 8 Drawing Sheets

(51) Int. Cl.

| | |
|---|---|
| *B62J 25/06* | (2020.01) |
| *B62K 3/00* | (2006.01) |
| *B62K 3/10* | (2006.01) |

(52) U.S. Cl.
CPC .......... *B62K 3/10* (2013.01); *B62K 2015/003* (2013.01); *B62K 2206/00* (2013.01)

(58) Field of Classification Search
USPC ........................................................ 280/287
See application file for complete search history.

(56) References Cited

U.S. PATENT DOCUMENTS

| | | | | |
|---|---|---|---|---|
| 4,400,003 | A | * | 8/1983 | de la Haye ............ B62K 15/00 |
| | | | | 280/281.1 |
| 5,772,227 | A | | 6/1998 | Michail |
| 6,595,539 | B1 | | 7/2003 | Belli |
| 8,789,840 | B2 | * | 7/2014 | Priest ..................... B62K 11/10 |
| | | | | 280/278 |
| 9,205,889 | B2 | * | 12/2015 | Paick ................... B62K 15/006 |
| D781,753 | S | | 3/2017 | Wunderlin |
| 9,643,680 | B2 | * | 5/2017 | Bang ...................... B62K 3/002 |
| D804,365 | S | | 12/2017 | Wunderlin |
| D804,366 | S | | 12/2017 | Wunderlin |
| 9,873,477 | B2 | * | 1/2018 | Wunderlin ............. B62K 21/24 |
| 2008/0061529 | A1 | | 3/2008 | Schmautz |
| 2011/0025016 | A1 | * | 2/2011 | Waaijer ................ B62K 15/006 |
| | | | | 280/287 |
| 2015/0021876 | A1 | | 1/2015 | Hartmann |
| 2016/0236744 | A1 | | 8/2016 | Bailie et al. |
| 2017/0037889 | A1 | | 2/2017 | Loesch et al. |

| | | | |
|---|---|---|---|
| 2017/0240241 | A1 | 8/2017 | Wunderlin |
| 2018/0127049 | A1 | 5/2018 | Molnar |
| 2019/0031270 | A1 | 1/2019 | Thompson |

FOREIGN PATENT DOCUMENTS

| | | | | |
|---|---|---|---|---|
| CN | 201989902 U | | 9/2011 | |
| CN | 202646346 U | | 1/2013 | |
| CN | 105539685 A | * | 5/2016 | ........... B62K 15/006 |
| DE | 28 34 384 A1 | | 2/1979 | |
| DE | 4446112 A1 | * | 6/1996 | ............. B62K 15/00 |
| DE | 695 16 806 T2 | | 2/2001 | |
| DE | 699 03 260 T2 | | 6/2003 | |
| DE | 10 2004 045 971 A1 | | 4/2006 | |
| DE | 10 2006 012 938 A1 | | 9/2007 | |
| DE | 10 2009 055 222 A1 | | 6/2011 | |
| DE | 10 2008 026 812 A1 | | 12/2011 | |
| DE | 20 2012 000 700 U1 | | 3/2012 | |
| DE | 20 2011 109 835 U1 | | 5/2012 | |
| DE | 10 2012 203 859 B3 | | 9/2013 | |
| DE | 10 2015 111 976 A1 | | 2/2016 | |
| DE | 10 2016 102 369 A1 | | 8/2016 | |
| DE | 11 2016 006 115 T5 | | 9/2018 | |
| EP | 2 471 701 A1 | | 7/2012 | |
| EP | 2 519 436 B1 | | 11/2012 | |
| EP | 2 711 278 B1 | | 3/2014 | |
| EP | 2 897 855 B1 | | 7/2015 | |
| EP | 3 138 766 A1 | | 3/2017 | |
| EP | 3 263 434 A1 | | 1/2018 | |
| GB | 1 603 329 | | 11/1987 | |
| GB | 2499586 A | | 8/2013 | |
| GB | 2530391 A | | 3/2016 | |
| IT | VR2011040 A1 | | 1/2013 | |
| KR | 1020110075747 A | | 7/2011 | |
| WO | WO 2009/088 708 A1 | | 1/2009 | |

OTHER PUBLICATIONS

International Search Report of PCT/EP2021/065827, Jun. 11, 2021, 6 pages.
Written Opinion of International Searching Authority of PCT/EP2021/065827, Jun. 11, 2021, 6 pages.

* cited by examiner

ALPINE BICYCLE

This application is a national US phase of PCT/EP2021/065827 which claims the benefit of the filing date of the German Patent Application No. 10 2020 116 725.3 filed 25 Jun. 2020, the disclosure of which is hereby incorporated herein by reference.

TECHNICAL FIELD

Embodiments of the present invention relate to a bicycle for driving downhill and a method of providing a bicycle for driving downhill.

TECHNICAL BACKGROUND

It is known to configure bicycles, so-called mountain bikes, suitable for all-terrain driving, to therefore drive the bicycle off-road and in particular in the mountains. Downhill driving is very popular, wherein in particular very high velocities can be reached. To provide a sufficient robustness and a sufficient comfort, mountain bikes comprise large dimensioned frames and complex spring systems and braking systems. This leads to a high complexity and a high weight of mountain bikes. Due to this reason, mountain bikes in a rough terrain are less suitable to be transported by a mountain hiker or a climber

SUMMARY OF EMBODIMENTS OF THE INVENTION

There may be a need to provide a lightweight downhill bicycle which is in particular suitable for hiking sports and climbing sports.

This need is met by a bicycle for driving downhill and a method of providing a bicycle for driving downhill according to the subject matters of the independent claims.

According to a first aspect of the present invention, a bicycle for driving downhill is described. The bicycle comprises a front wheel region, a rear wheel region and a support rod which couples the front wheel region and the rear wheel region with each other. The support rod comprises at least one hinge for unfolding and folding the support rod. The support rod comprises a front rod portion between the front wheel region and the hinge and a rear rod portion between the rear wheel region and the hinge.

The bicycle further comprises a foot rod which is pivotably mounted with a coupling portion to the support rod. The foot rod, at a foot portion which is opposing the coupling portion, comprises a footrest region for resting feet of a user of the bicycle.

Furthermore, the bicycle comprises a tension rope system with a first rope tensioning portion and a second rope tensioning portion, wherein the first rope tensioning portion is coupled to the foot portion and the front rod portion, and the second rope tensioning portion is coupled to the foot portion and the rear rod portion, such that, when exerting a weight force on the foot portion, the foot rod is alignable in a weight force direction and the tension rope system is tensible.

According to a further aspect of the present invention, a method of providing an above-described bicycle for driving downhill is provided. The method comprises unfolding and folding the support rod and pivoting the foot rod, such that a weight force is exertable on the foot portion of the foot rod, to align the foot rod in the weight force direction, and the tension rope system is tensioned.

The bicycle according to embodiments of the invention is in particular configured to be lightweight and simple, to be simply and force-savingly carried by a user in a folded state. In an unfolded state, i.e. in an active operation state, the user can stand on the bike and drive downhill. By the bicycle according to embodiments of the invention, in particular a simple system is provided by which nevertheless a bicycle is provided which is robust for driving downhill.

The support rod may be manufactured of a lightweight construction material, such as aluminum, or a fiber composite material, such as a carbon fiber composite material or a glass fiber composite material. Furthermore, the support rod may consist of a hollow profile.

For example, the hinge is provided by a fulcrum pin (German: Drehbolzen) which forms a pivoting axis for at least the front rod portion or the rear rod portion along its extension direction. Between the front rod portion and the rear rod portion, further rod portions may be introduced, for example the center rod portion which is described below. For example, the front rod portion may be directly mounted via the hinge to the rear rod portion. For example, the hinge may comprise two fulcrum pins in this case, wherein the front rod portion is rotatable around a first fulcrum pin and the rear rod portion is rotatable around a second fulcrum pin. The first and the second fulcrum pin may form pivoting axes which are aligned in parallel to each other, or skew, or not in parallel with each other.

According to an exemplary embodiment, the hinge comprises a bearing sleeve (German: Lagerhülse) which is configured such that the support rod is hinged for unfolding and folding.

According to an exemplary embodiment, at least the first rope tensioning portion or the second rope tensioning portion is fixed in an interior of the bearing sleeve or extends through the bearing sleeve.

According to an exemplary embodiment, the rope tensioning system comprises a third rope tensioning portion which extends along a top side and is fixed to the support rod at opposing sides with respect to the hinge, wherein the third rope tensioning portion is configured such that it generates a torque around the hinge by tension, opposing to the torque which is generatable by the first rope tensioning portion and the second rope tensioning portion.

According to an exemplary embodiment, the bicycle comprises a quick release which detachably fixes the third rope tensioning portion to the support rod.

According to an exemplary embodiment, the bicycle comprises a braking lever which is pivotably mounted to the rear rod portion, such that the braking lever is pivotable in the direction of the rear wheel and, in a blocking position, is couplable with the rear wheel, such that a further rotation of the rear wheel is preventable.

Hence, the hinge may be configured with a bearing sleeve and/or as a hollow axis. For example, the bearing sleeve may be rotatably fixed to the front rod portion. The front rod portion may comprise a fork-shape at the hinge and may partially enclose the bearing sleeve or may comprise a corresponding opening and fully enclose the bearing sleeve. Furthermore, at the bearing sleeve, the further connection partner is coupled, such as the center rod portion or the rear rod portion. The front rod portion on the one hand or the center rod portion or the rear rod portion on the other hand may be configured torsion-proof with the bearing sleeve, and at least another connection partner may be configured rotatable with the bearing sleeve. The first rope tensioning portion and/or the second rope tensioning portion may be fixed to the bearing sleeve. In particular, the first rope tensioning portion and/or the second rope tensioning portion may be fixed in the interior of the bearing sleeve.

In an alternative embodiment, in which the first rope tensioning portion and the second rope tensioning portion form a common tension rope, the tension rope may be guided from the foot rod through the bearing sleeve and correspondingly through the front rod portion, and may be guided back to the foot rod on the opposing side.

In particular in case of a coupling of the tension rope system to the bearing sleeve, a mechanically preferred coupling, in particular a torque-free coupling, enabled, since the rotation axis of the hinge is formed in the interior of the bearing sleeve and thus the fixation of the tension rope system is present on or in the close environment of the rotation axis of the hinge, so that no connection or substitution of the tension rope system occurs, for example. In particular, in this case, no or almost no negative torque is transferred to a tension lever (German: Spannhebel) for fixing the tension ropes.

Furthermore, corresponding to the front hinge, the further hinge which is described below may be configured with a bearing sleeve.

From the support rod, the foot rod extends, which is pivotably mounted to the support rod, i.e. to the front rod portion, the rear rod portion, or a center rod portion, for example. At the foot portion which is opposing to the coupling portion, a foot resting region is formed, on which the user can stand with his feet on the bicycle when driving downhill.

For stabilizing the support rod in the operation state, i.e. in the unfolded state, the tension rope system is provided. It comprises a rope or multiple ropes, wherein a first rope tensioning portion extends from the foot portion of the foot rod in the direction of the front rod portion, and a second rope tensioning portion extends from the foot portion to the rear rod portion. The foot rod pushes the first rope tensioning portion and the second rope tensioning portion at their coupling with the foot portion away from the support rod, so that a tensioned and thus stable system between the support rod, the foot rod, and the tension rope system is established.

The rope tensioning portions may be made of ropes consisting of natural fibers, such as hemp, or of synthetic fibers. Furthermore, the rope tensioning portions may comprise rope-like, ribbon-like, or belt-like elements. Additionally, the rope tensioning portions may be made of chain links.

Since the user introduces its weight force via the foot portion into the bicycle, the pivotable foot rod aligns in the direction of the weight force and thus automatically tensions the first rope tensioning portion and the second rope tensioning portion. This leads to the support rod with the front rod portion and the rear rod portion maintaining in the operation position, i.e. in the unfolded state, during the operation of the bicycle, i.e. for example during driving downhill. Also in case of uneven terrain, the weight force of the user leads to the operation position of the support rod being ensured at all times.

Due to this construction of the bicycle, it is not necessary to provide complex mechanics or fixing units, for example, which arrest the hinge or the foot rod in a certain position, for example. Alone by introducing the weight force, a rigid operation position of the bicycle is ensured. Thus, a lightweight bicycle without complex mechanics is provided, which is quickly and simply unfoldable and foldable. Due to the lightweight and compact construction, the bicycle is in particular suitable for hiking sports and climbing sports, since it may be simply handled, for example, and it may be stored in a backpack, for example.

According to a further exemplary embodiment, the support rod comprises a bottom side (i.e. a first side/surface) and a top side which is opposing to the bottom side (i.e. a second side/surface). The front wheel region comprises a mounting portion for a front wheel and the rear wheel region comprises a mounting portion for a rear wheel, which are arranged in a lower region of the bottom side. The foot rod extends from the bottom side of the support rod in the lower region. Due to the abutment of the wheels on a ground, bearing forces are introduced in the front wheel region and in the back wheel region, which counteract the weight force of the user which is introduced in the footrest region of the foot rod. By the weight force of the user, which is transferred via the footrest region to the rope tensioning portions, the rope tensioning portions remain securely tensioned, also when the bearing forces temporarily do not act, for example due to vibrations or a contact loss of the wheels with the ground.

According to a further exemplary embodiment, the first rope tensioning portion and/or the second rope tensioning portion is guidable from the bottom side to an opposing top side of the support rod and is, in particular detachably, fixed at the top side. In particular by the detachable attachment of the rope tensioning portions on the top side of the support rod, the user may fix, and for example tension, the rope tensioning portions in a simple manner.

According to a further exemplary embodiment, the first rope tensioning portion extends along the top side via the hinge, such that the first rope tensioning portion is guided at the front rod portion from the bottom side to the top side of the support rod and is fixed on the top side to the support rod portion which, opposing to the front rod portion, abuts against the hinge.

Additionally or alternatively, in a further exemplary embodiment, the second rope tensioning portion extends along the top side via the hinge, such that the second rope tensioning portion is guided at the rear rod portion from the bottom side to the top side of the support rod and is fixed on the top side to the support rod portion which, opposing to the rear rod portion, abuts against the hinge.

In a manner of speaking, the first rope tensioning portion is guided along a surface via the hinge and is fixed to an adjoining portion, for example the center rod portion or the rear rod portion. In a further exemplary embodiment, the first rope tensioning portion may be guided via the hinge and via the further hinge which is described below and may be fixed to the rear rod portion. Correspondingly, the second rope tensioning portion may be guided along the surface via the hinge and/or the further hinge and may be correspondingly fixed to the center rod portion or the front rod portion.

Therefore, in the exemplary embodiment, the force introduction point of the weight force of the user which is transferred from the user via the footrest region to the first rope tensioning portion and the second rope tensioning portion is placed on the top side of the support rod. Thus, the rope forces which are introduced via the hinge-conveyed rope tensioning portions on the top side of the support rod cause a torque around the hinge and/or the further hinge which comprises the same direction as the bearing forces which are introduced via the wheels. In other words, the bearing forces and the rope tensioning portions generate a commonly directed torque around the hinge which forces or biases the support rod or the front rod portion and the rear rod portion in the unfolded state, i.e. the operation state. Due to the introduction of the rope forces at the front rod portion and the rear rod portion, which in turn are generated by the weight force of the user, the stabilizing torques at the hinges, which torques hold the support rod in the unfolded state, are reinforced.

According to a further exemplary embodiment, the front rod portion and the rear rod portion, in an unfolded state, define an operation position of the bicycle, wherein the hinge is configured such that, when the front rod portion and the rear rod portion (and optionally the center rod portion) are in the operation position, a folding movement of the front rod portion and the rear rod portion in the direction of the bottom side is free, and a folding movement in the direction of the top side is blocked.

For example, the hinge is configured such that the front rod portion and the rear rod portion can be pivoted around 90° from the operation position. For example, the hinge may be configured such that, in the operation position, the rod ends of the rod portions abut above the hinge in the direction of the top side, such that no pivoting of the rod portions from the operation position in the direction of the top side is possible. For this purpose, for example a fulcrum pin bearing of the hinge at the bottom side of the adjoining rod portions may be formed, so that, from the operation position, pivoting the rod portions is only possible in the direction of their bottom side.

According to a further exemplary embodiment, the hinge or the further hinge may be configured such that, when the front rod portion and the rear rod portion are in the operation position, a folding movement of the front rod portion and the rear rod portion and/or the center rod portion in the direction of the top side is free, and a folding movement in the direction of the bottom side is blocked. Thus, the rope forces which are introduced e.g. at the bottom side of the support rod, cause a torque around the hinge and/or the further hinge, which comprises the opposite direction as the bearing forces which are induced via the wheels. In other words, the bearing forces and the rope tensioning portions generate counteracting torques around the hinge and/or the further hinge, to maintain the support rod and/or the rod portions in the unfolded state, i.e. the operation state.

According to a further exemplary embodiment, the hinge and/or the further hinge is freely pivotable and free of an arresting unit. According to embodiments of the invention, in the operation position, pivoting the front rod portion and the rear rod portion (and/or the center rod portion) in the direction of the top side is blocked due to the configuration of the hinge and the rod portions. Pivoting the front rod portion and the rear rod portion (and/or the center rod portion) in the direction of the bottom side is prevented by the bearing forces of the wheels and additionally by the rope forces of the rope tensioning portions which are generated by the weight force of the user. Therefore, further weight-intense and complex arresting devices for fixing the rod portions in the operation position may not be necessary.

According to a further exemplary embodiment, the foot rod is fixed to the hinge. For example, the hinge may comprise a massive baseplate which also allows a pivotable fixing of the foot rod. This leads to a simplification in manufacture of the bicycle according to embodiments of the invention.

According to a further exemplary embodiment, the first rope tensioning portion and the second rope tensioning portion form portions of a common rope. In other words, a monolithic and integrally formed rope may be used which is guided from the front rod portion via the foot rod to the rear rod portion. Due to the pivoting of the foot rod by the weight force of the user, the rope is nevertheless pushed away from the support rod and thus the weight force is introduced in the rope.

According to a further exemplary embodiment, the foot rod slidingly abuts with the foot portion against the rope. This means that no fixation between the rope and the foot rod is necessary. The footrest region of the foot rod can thus slide and/or be displaced along the rope. Therefore, the necessity of an exact length adjustment of the first rope tensioning portion and the second rope tensioning portion is eliminated. Due to the load of the user on the foot rod, it aligns substantially along the direction of the weight force and thus pushes the rope away from the carrier rod, so that a homogenous tension of the first rope tensioning portion and the second rope tensioning portion is generated.

According to a further exemplary embodiment, the first rope tensioning portion forms a first rope and the second rope tensioning portion forms a second rope which is separated from the first rope. An end of the first rope and an end of the second rope are fixed to the footrest region.

According to a further exemplary embodiment, in particular foldable foot pedals for resting the feet of a user are arranged at the foot portion. The foot pedals may also comprise a roughened surface, for example, to improve the adhesion of a foot of a user. The foot pedals may be unfolded in the operation state and may be correspondingly folded.

According to a further exemplary embodiment, at least one of the foot pedals is unfoldable downwards, to function as a bicycle stand. For example, the foot pedal may latch in two folding positions with respect to the foot rod. In a first latching position, the foot pedal is fixed in particular perpendicularly to the foot rod, to represent a rest for a foot of the user. In a second latching position, the foot pedal is fixed with an angle between 130° and 180° to the foot rod, to bear the bicycle on the foot pedal. In a further exemplary embodiment, the foot pedal and/or the foot rod is adjustable in length, in particular due to a configuration which is extendable and retractable in a telescopic manner.

According to a further exemplary embodiment, at least one of the foot pedals is arranged at the support rod in a manner pivotable around a first pivoting axis, such that it is unfoldable and foldable, wherein at least one of the foot pedals is further arranged at the foot rod in a manner pivotable around a second pivoting axis. The second pivoting axis is formed in particular perpendicular to the first pivoting axis and in particular in parallel to an extension direction of the support rod. In other words, a pivoting axis of the foot rod at the support rod, for example at the center rod portion or the rear rod portion, is not parallel or comprises an angle to a pivoting axis of the further hinge between the center rod portion and the rear rod portion and/or the further hinge between the front rod portion and the rear rod portion. Thus, also a compact architecture can be achieved in a folded state.

According to a further exemplary embodiment, the foot pedal is mounted with a hinge sleeve to a further hinge sleeve in a manner pivotable around the first pivoting axis, wherein the further hinge sleeve is fixed to a guiding bush or a guiding pin which is fixedly coupled with the foot rod, wherein the guiding bush extends in particular in parallel to the foot rod.

According to a further exemplary embodiment, an inclined bearing surface for the foot pedal is formed at the foot rod, wherein the inclined bearing surface is arranged spaced apart from the guiding bush. The bearing surface is configured such that the foot pedal, during pivoting around the first pivoting axis and around the second pivoting axis, at least partially abuts along the inclined bearing surface. The inclined bearing surface is further configured such that, in an operation position, the foot pedal is substantially perpendicular to the foot rod, and while moving the foot pedal along the inclined bearing surface and simultaneously pivoting the foot pedal around the second rotation axis, the foot pedal pivots around the first pivoting axis.

According to a further exemplary embodiment, the bicycle comprises a tension lever for adjusting a rope length of the first rope tensioning portion and/or the second rope tensioning portion. Thus, in the operation state, the rope tensioning portions can be biased.

According to a further exemplary embodiment, the support rod comprises at least one further hinge, and between the hinge and the further hinge, a center rod portion is formed. Thus, the center rod portion connects the front rod portion with the rear rod portion. At the center rod portion, the coupling portion of the foot rod may be arranged, for example. Due to the introduction of the center rod portion and the possibility of folding via the hinge and the further hinge, the bicycle can be folded and stored more compactly.

According to a further exemplary embodiment, a pivoting axis of the hinge and a further pivoting axis of the further hinge are not in parallel, are in particular skew, to each other. This leads to the front rod portion and the rear rod portion together with the corresponding front wheels and rear wheels overlapping each other in a folded state, and therefore a more compactly folded state is possible.

According to a further exemplary embodiment, at least the first rope tensioning portion or the second rope tensioning portion is formed by a fixing eyelet which is arranged around a fixing pin which is fixed to the foot rod.

According to a further exemplary embodiment, the fixing pin comprises a cylindrical shape and a fixing screw is in parallel to a longitudinal axis of the cylindrical fixing pin, such that an outer surface of the cylindrical fixing pin forms a bearing surface for the rope portions of the rope tensioning portion or of the second rope tensioning portion.

According to a further exemplary embodiment, the fixing screw comprises a screw axis which is in parallel to the longitudinal axis of the cylindrical fixing pin, wherein the longitudinal axis of the cylindrical fixing pin is formed spaced apart from the screw axis of the fixing screw.

According to a further exemplary embodiment, at the front wheel region, a steering rod is arranged pivotably around a steering axis, at which a front wheel is fixable. The steering rod may be foldably fixed to the front rod portion and may be correspondingly pivoted between a folded state and the operation state. A clamping device, in particular a quick clamping device, may fix the folded state of the steering rod, for example. Furthermore, the steering rod may be configured length-adjustable.

According to a further exemplary embodiment, at the steering rod, at least one handlebar is arranged, which extends from the steering rod with an angle of 45° to 130°, in particular 90°. For example, the handlebar comprises a bicycle handle which a user can grip and can therefore control the steering rod and correspondingly the bicycle. At the handlebar, a corresponding braking device comprising a braking lever is fixed, for example.

According to a further exemplary embodiment, between the steering rod and the handlebar, a steering hinge is arranged, such that the handlebar is foldable relatively to the steering rod, and in the folded state, the handlebar is in parallel to the steering rod.

In an exemplary embodiment, at the front wheel region or the rear wheel region, additionally a damping system may be integrated, e.g. with a damped bicycle fork, which damps the front wheel or the rear wheel. Moreover, at the steering rod, a damping system may be installed. Furthermore, at the front wheel and/or the rear wheel, a corresponding braking system may be installed, e.g. with disk brakes, which may be controlled from the foot portion or from the handlebar. This may be accomplished via cable pull systems, for example. The front wheel and the rear wheel may comprise different diameters (e.g. 14" (inches) front wheel, 12" rear wheel). Furthermore, two or more wheels (e.g. tricycle configuration, three-lane bicycle) may be arranged on the rear axis or the front axis.

It is noted that embodiments of the invention are described with reference to different subject matters of embodiments of the invention. In particular, some embodiments of the invention are described by device claims and other embodiments of the invention are described with method claims. However, it is immediately understood by a person skilled in the art, that, unless explicitly specified otherwise, additionally to a combination of features which belong to a type of subject matter of embodiments of the invention, also an arbitrary combination of features is possible, which belong to different types of subject matters of embodiments of the invention.

DETAILED DESCRIPTION OF EXEMPLARY EMBODIMENTS

In the following, for the further explanation and for a better understanding of the embodiments of the present invention, embodiments are described in more detail with reference to the accompanied drawings.

Same or similar components in different figures are provided with the same reference numbers. The illustrations in the figures are schematic.

FIG. 1, shows a schematic illustration of a side view of the bicycle 100 in the operation state, and FIG. 2 shows a perspective view of the bicycle 100 of FIG. 1.

Figure 1:
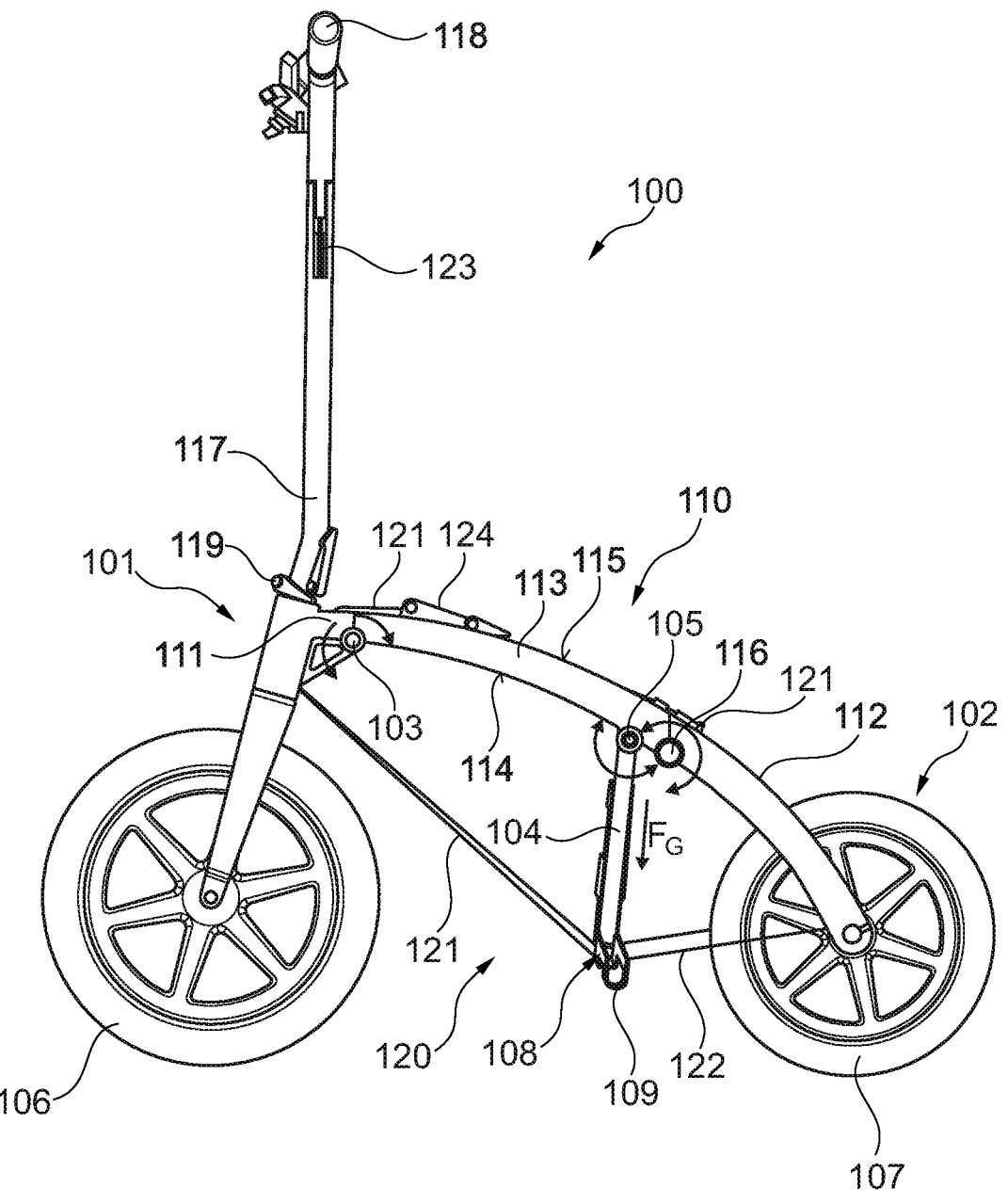
FIG. 1 shows a schematic illustration of a side view of the bicycle in the operation state according to an exemplary embodiment of the present invention.
Figure 2:
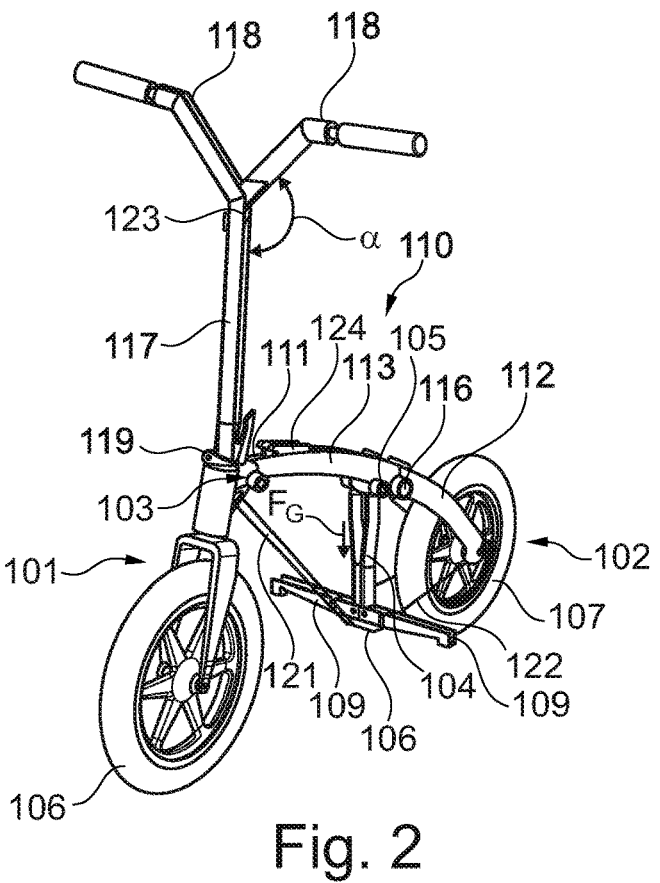
FIG. 2 shows a perspective view of the bicycle of FIG. 1 according to an exemplary embodiment of the present invention.

The shown bicycle 100 is in particular configured for downhill driving. The bicycle 100 comprises a front wheel region 101, a rear wheel region 102, and a support rod 110 which couples the front wheel region 101 and the rear wheel region 102 with each other. The support rod 110 comprises at least one hinge for unfolding and folding, wherein the support rod 110 comprises a front rod portion 111 between the front wheel region 101 and the hinge 103, and a rear rod portion 112 between the rear wheel region 102 and the hinge 103. A foot rod 104 is, with a coupling portion 105, pivotably mounted to the support rod 110, wherein the foot rod 104 comprises a footrest region at a foot portion which is opposing to the coupling portion 105, for resting the feet of a user of the bicycle 100. A tension rope system 120 comprises a first rope tensioning portion 121 and a second rope tensioning portion 122, wherein the first rope tensioning portion 121 is coupled to the foot portion and the front rod portion 111, and the second rope tensioning portion 122 is coupled to the foot portion and the rear rod portion 112, such that, when exerting a weight force on the foot portion, the foot rod 104 is alignable in the weight force direction, and the tension rope system 120 is tensible. In the unfolded state, i.e. in an operation state, the user can stand on the bicycle 100 and drive downhill.

For example, the hinge 103 is provided by a fulcrum pin, which forms a pivoting axis 301 (see FIG. 3, for example) along its extension direction for at least the front rod portion 111 or the rear rod portion 112. Between the front rod portion 111 and the rear rod portion 112, the center rod portion 113 is introduced.

From the support rod 110, the foot rod 104 extends, which is pivotably mounted with a coupling portion 105 to the support rod 110, i.e. in the embodiment of FIG. 1 for example to the center rod portion 113. At the foot portion which is opposing to the coupling portion 105, a footrest region 108 is formed, on which the user can stand with its feet on the bicycle 100 when driving downhill.

For stabilizing the support rod 110 in the operation state, i.e. in the unfolded state, the tension rope system 120 is provided. A first rope tensioning portion 121 extends from the foot portion of the foot rod 104 in the direction of the front rod portion 111, and a second rope tensioning portion 122 extends from the foot portion to the rear rod portion 112. The foot rod 104 pushes the first rope tensioning portion 111 and the second rope tensioning portion 112 at their coupling with the foot portion away from the support rod 110, such that a tensioned and thus stable system between the support rod 110, the foot rod 104, and the tension rope system 120 is established.

The pivotable foot rod 104 aligns due to the weight force FG in the direction of the gravity and therefore automatically tensions the first rope tensioning portion 121 and the second rope tensioning portion 122. This leads to the support rod 110 with the front rod portion 111 and the rear rod portion 112 maintaining in the operation position, i.e. in the unfolded state during the operation of the bicycle 100, i.e. for example during driving downhill.

The support rod 110 comprises a bottom side 114 and a top side 115 which is opposite to the bottom side 114. The front wheel region 101 comprises a mounting portion for a front wheel 106 and the rear wheel region 102 comprises a mounting portion for a rear wheel 107, which are arranged below the bottom side 114. The foot rod 104 extends from the bottom side 114 of the support rod 110 in the lower region. Due to the bearing of the wheels 106, 107 on a ground, in the front wheel region 101 and in the rear wheel region 102, bearing forces are introduced, which counteract the weight force Fg of the user which is introduced in the footrest region 105 of the foot rod 104. By the weight force Fg of the user which is transferred via the footrest region 105 to the rope tensioning portions 121, 122, the rope tensioning portions 121, 122 remain securely tensioned.

In the exemplary embodiment of FIG. 1, the first rope tensioning portion 121 leads from the bottom side 114 to the opposing top side 115 of the support rod 110. The first rope tensioning portion 121 extends along the top side 115 via the hinge 103, such that the first rope tensioning portion 121 is guided at the front rod portion 111 from the bottom side 114 to the top side 115 of the support rod, and is fixed to the top side 115 at the center rod portion 113 which, opposing to the front rod portion 111, abuts on the hinge 103.

In the exemplary embodiment of FIG. 1, the first rope tensioning portion 121 further extends along the top side 115 via a further hinge 116 which pivotably couples the rear rod portion 112 with the center rod portion 113. When the first rope tensioning portion 121 is loaded in tension due to the weight force Fg, the rod portions 111, 112, 113 are fixed in the operation position.

The force introduction point of the weight force Fg of the user which is transferred from the user via the footrest region 108 to the first rope tensioning portion 121 and the second rope tensioning portion 122, is placed on the top side 115 of the carrier rod 110. Thus, the rope forces which are introduced via the hinge-conveying rope tensioning portions on the top side 115 of the support rod 110 cause a torque around the hinge 103 and/or the further hinge 116, which comprises the same direction as the bearing forces which are induced via the wheels 106, 107. In other words, the bearing forces and the rope tensioning portions 121, 122 generate a commonly directed torque around the hinge 103, 116 which forces or biases the support rod 110 and/or the rod portions 111, 112, 113 in the unfolded state, i.e. the operation state.

The rod portions 111, 112, 113, in an unfolded state, define an operation position of the bicycle, wherein e.g. the hinge 103 is configured such that, when the front rod portion 111 and the center rod portion 113 are in the operation position, a folding movement of the front rod portion 111 and the center rod portion 113 in the direction of the bottom side or lower side 114 is free, and a folding movement in the direction of the top side 115 is blocked.

For example, the hinge 103 is configured such that the front rod portion 111 and the center rod portion 113 can be pivoted by 90° from the operation position. For example, the hinge 103 may be configured such that, in the operation position, above the hinge 103 in the direction of the top side 115, the rod ends of the rod portions 111, 113 abut, such that no pivoting of the rod portions 111, 113 from the operation position in the direction of the top side 115 is possible. As illustrated in FIG. 1, for example a fulcrum pin bearing of the hinge 103 at the bottom side of the adjoining rod portions 111, 113 may be formed for this purpose, such that pivoting the rod portions 111, 113 is only possible in the direction of their bottom side 104 from the operation position. Corresponding to the hinge 103, the further hinge 116 can be formed, which connects the center rod portion 113 and the rear rod portion 112.

The hinge 103 and the further hinge 103 are freely pivotable and free from an arresting unit.

According to embodiments of the invention, in the operation position, pivoting the front rod portion 111 and the rear rod portion 112 (and/or the center rod portion 113) in the direction of the top side 115 is blocked due to the configuration of the hinge 103, 116 and of the rod portions 111, 112, 113. Pivoting the front rod portion 111 and the rear rod portion 112 (and/or the center rod portion 113) in the direction of the bottom side 114 is prevented by the bearing forces of the wheels 106, 107 and additionally by the rope forces of the rope tensioning portions 121, 122 which are generated by the weight force Fg of the user.

The first rope tensioning portion 121 and the second rope tensioning portion 122 form portions of a common rope. However, due to the pivoting of the foot rod 104 by the weight force of the user, the rope is pushed away from the support rod and the weight force is introduced in the rope. The foot rod 104 with the foot portion slidingly abuts on the rope. This means, that no fixing between the rope and the foot rod 104 is necessary. The footrest region 108 of the foot rod 104 may thus slide or being displaced along the rope. Due to the load of the user on the foot rod 104, it aligns substantially along the direction of the weight force Fg and thus pushes the rope away from the support rod 110, so that a homogenous tension of the first rope tensioning portion 121 and the second rope tensioning portion 122 is thereby generated.

At the foot portion, in particular foldable, foot pedals 109 for resting the feet of a user are arranged. The foot pedals 109 may additionally comprise a roughened surface, for example, to improve the adhesion of a foot of a user. The foot pedals 109 may be unfolded in the operation state and may be correspondingly folded.

The bicycle comprises a tension lever 124 for adjusting a rope length of the first rope tensioning portion 121 and/or the second rope tensioning portion 122. Hence, in the operation state, the rope tensioning portions 121, 122 can be biased.

At the front wheel region 101, a steering rod 117 is pivotably arranged around a steering axis, at which a front wheel 106 is fixable. The steering rod 117 may be fixed to the front rod portion 111 in a manner which is foldable around a steering rod hinge 119 and may be correspondingly pivoted between a folded state and the operation state. A clamping device, in particular a quick clamping device, may fix the folded state of the steering rod 117, for example. Furthermore, the steering rod 117 may be configured length-adjustable.

At the steering rod 117, at east one handlebar 118 is arranged, which extends from the steering rod 117 with an angle α of approximately 130°. For example, the handlebar 118 comprises a bicycle handle which a user can grip and can thus control the steering rod 117 and correspondingly the bicycle 100. At the handlebar 118, for example a corresponding braking device comprising a braking lever is fixed.

Figure 3:
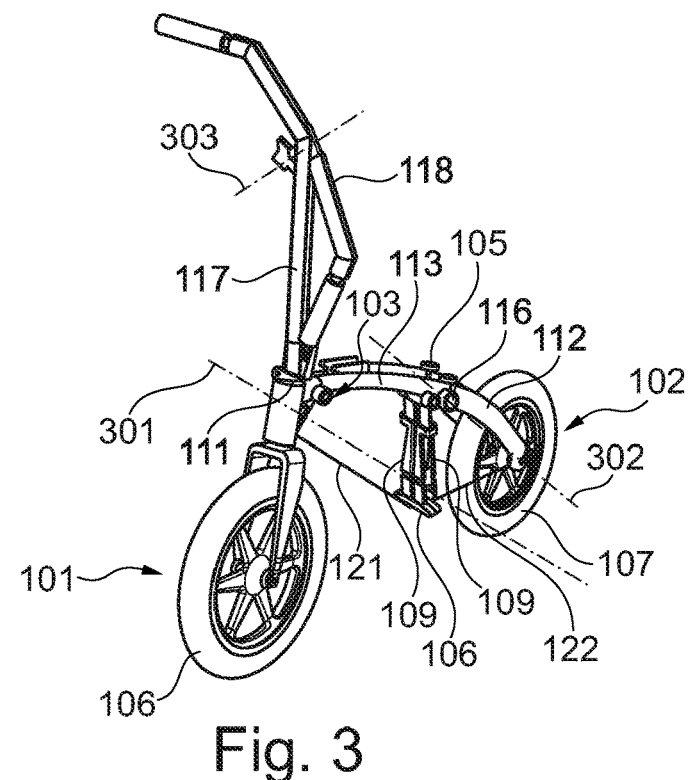
FIG. 3 shows a perspective view of the bicycle with folded foot pedals and a folded handlebar according to an exemplary embodiment of the present invention.

FIG. 3 shows a perspective view of the bicycle 100 with folded foot pedals 109 and a folded handlebar 118 according to an exemplary embodiment of the present invention.

For example, the foot rod 104 is fixed at the further hinge 116. For example, the hinge 116 may comprise a massive baseplate which additionally allows a pivotable fixation of the foot rod 104.

The foot pedals 109 are foldably fixed to the foot rod 104. Furthermore, at least one foot pedal 109 is unfoldable downwardly, to function as a bicycle stand. For example, the foot pedal 109 may latch in two folding positions with respect to the foot rod 104. In a first latching position, the foot pedal 109 is fixed in particular perpendicularly to the foot rod 104, to represent a rest for a foot of the user. In a second latching position, the foot pedal 109 is fixed with an angle between 130° and 180° to the foot rod 104, to support the bicycle 100 on the foot pedal 109.

In FIG. 3, it is shown that a pivoting axis 301 of the hinge 103 and a further pivoting axis 302 of the further hinge 116 are not in parallel, are in particular skew, to each other. This leads to, in a folded state, the front rod portion 111 and the rear rod portion 112 together with the corresponding front wheels 106 and rear wheels 107 overlapping each other and therefore a compact folded state is possible.

Between the steering rod 117 and the handlebar 118, a steering hinge 123 is arranged, such that the handlebar 118 is foldable relatively to the steering rod 117 around a further pivoting axis 303 and the handlebar 118 is parallel to the steering rod 117 in the folded state.

Figure 4:
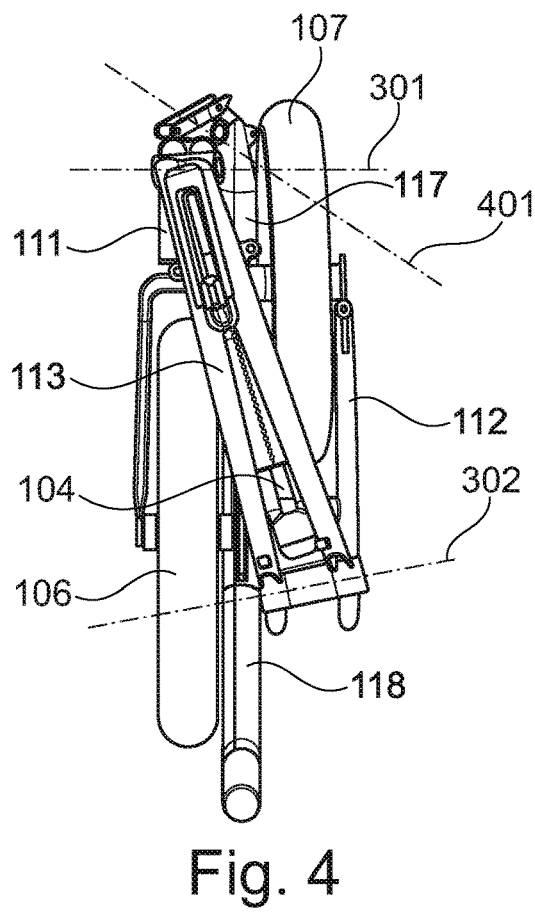
FIG. 4 to FIG. 6 show schematic illustrations of a bicycle in a folded state according to an exemplary embodiment of the present invention.
Figure 5:
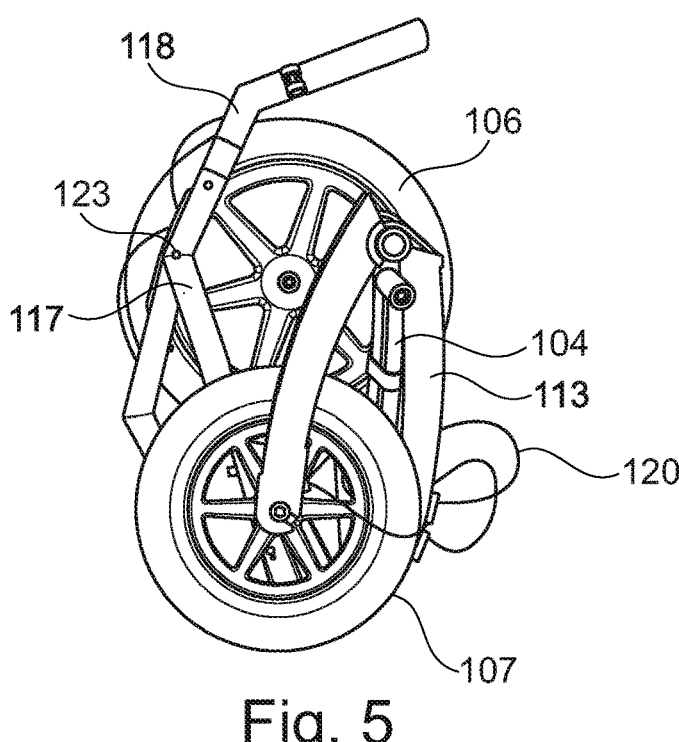
Figure 6:
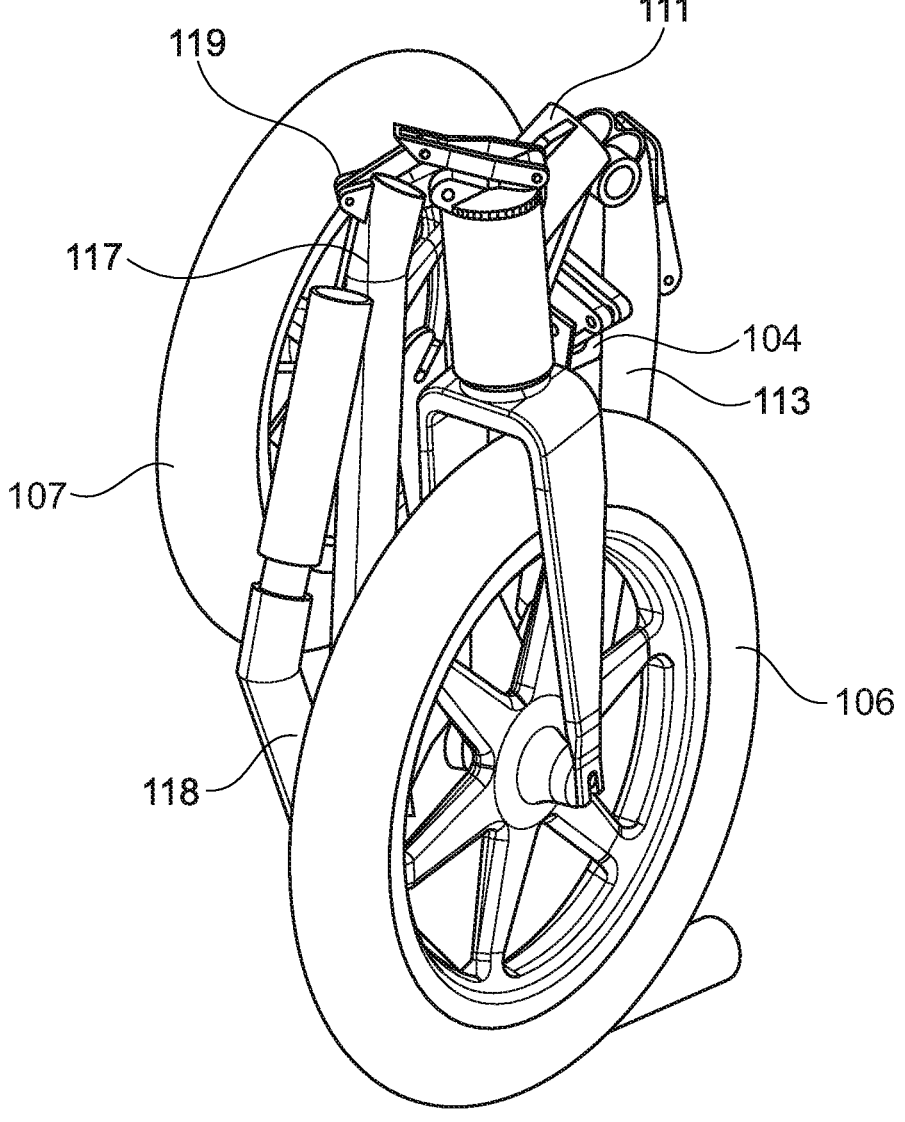

FIG. 4 to FIG. 6 show schematic illustrations of a bicycle in a folded state according to an exemplary embodiment of the present invention.

The pivoting axis 301 of the hinge 103 and the further pivoting axis 302 of the further hinge 116 are not in parallel, are in particular skew, to each other. As illustrated in FIG. 4, this leads to, in a folded state, the front rod portion 111 and the rear rod portion 112 together with the corresponding front wheels 106 and rear wheels 107 overlapping each other and therefore a compact folded state is possible.

At the front wheel region 101, the steering rod 117 is arranged pivotably around a steering axis, at which a front wheel 106 is fixable. The steering rod 117 is fixed to the front rod portion 111 in a manner which is foldable around a steering rod hinge 119 around the pivoting axis 401 and can correspondingly be pivoted between a folded state and the operation state. The pivoting axis 401 is also not in parallel to the other pivoting axes 301, 302, and 303, to enable a compact folding of the bicycle 100.

Figure 7:
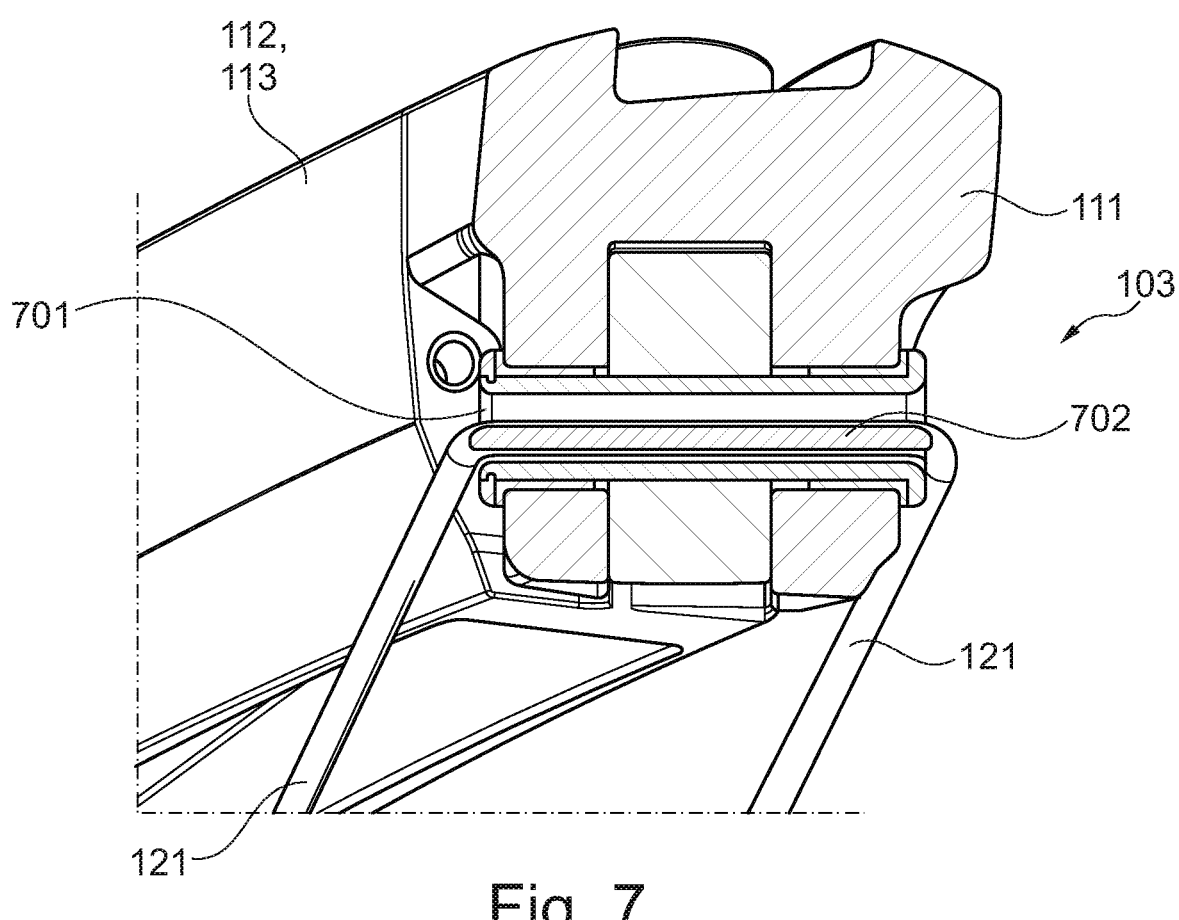
FIG. 7 and FIG. 8 show an exemplary embodiment of a hinge connection between parts of the support rod according to an exemplary embodiment of the present invention.
Figure 8:
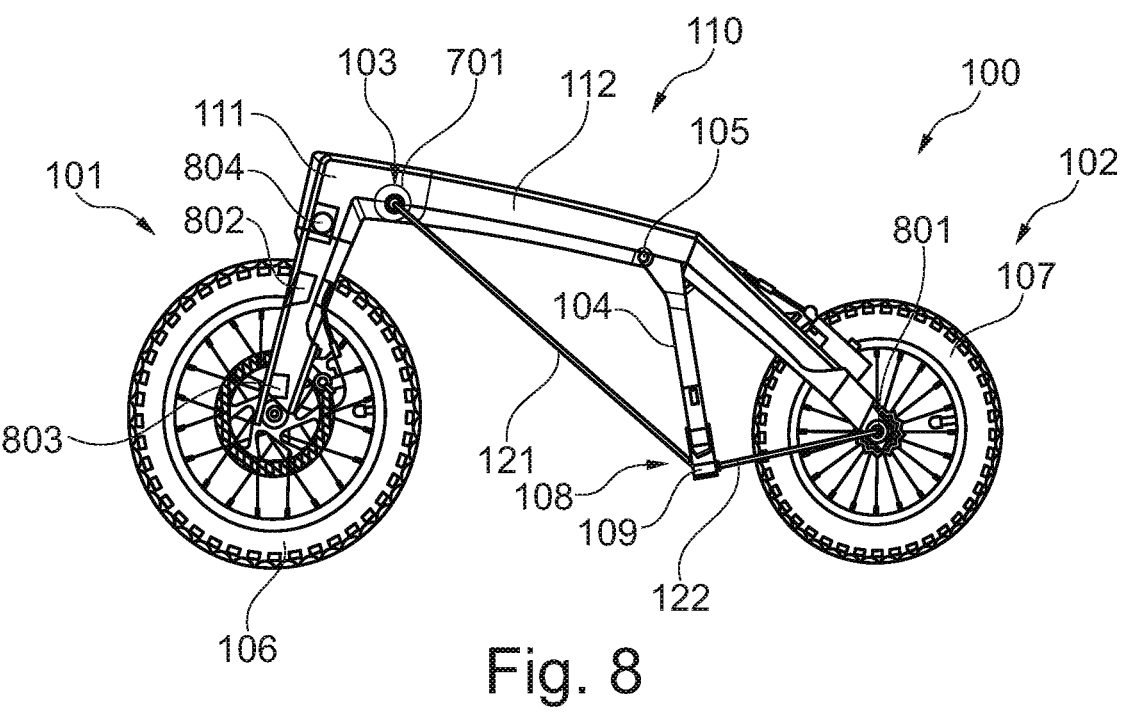

FIG. 7 and FIG. 8 show an exemplary embodiment of a hinge connection between parts of the support rod 110. For example, in FIG. 7, the hinge 103 is illustrated, which connects the front rod portion 111 with the center rod portion 113 or the rear rod portion 112.

The hinge is configured as a bearing sleeve or as a hollow axis 701. For example, the bearing sleeve 701 may be rotatably fixed to the front rod portion 111. The front rod portion 111 may comprise a fork shape at the hinge 103 and may partially enclose the bearing sleeve 701, or may comprise a corresponding opening and may fully enclose the bearing sleeve 701. Furthermore, at the bearing sleeve 701, the further connection partner, such as the center rod portion 113 or the rear rod portion 112, is coupled. The first rope tensioning portion 121 forms two rope portions which extend besides each other, wherein a connection portion 702 of the two rope portions extends through the bearing sleeve 701. Thus, the tension rope portion 121 may be guided from the foot rod 104 through the bearing sleeve 701 and correspondingly through the front rod portion 111 and may be guided back to the foot rod 104 on the opposing side.

Furthermore, corresponding to the front hinge 103, the further hinge 116 may be configured with a bearing sleeve 701.

Furthermore, a further bearing sleeve 801 may be provided at the end of the rear rod portion 112, at which the rear wheel 107 is rotatably fixed. Thus, for example the bearing sleeve 801 may be rotatably fix the rear wheel 107 to the rear rod portion 112. The further bearing sleeve 801 is non-rotatably fixed to the rear rod portion 112, for example, wherein the rear wheel 107 can rotate around the further bearing sleeve 801. Correspondingly, the second rope tensioning portion 122 may extend through the further bearing sleeve 801 or may be fixed in the further bearing sleeve 801.

Furthermore, the bicycle 100 may comprise a driving unit 802, 803, which is in particular battery-driven. Thus, for example in the support rod 110 and/or in the front rod portion 111, the rear rod portion 112 and/or the center rod portion 113, a battery 804 or a battery pack may be arranged. A driving unit 803, for example a wheel hub motor, may be arranged in the front wheel 106 and/or in the rear wheel 107, for example, to drive them. The driving unit 803 is electrically coupled with the battery 804. Furthermore, a driving unit 802 may be arranged at the support rod 110 in the region of an outer surface of the front wheel 106 and/or of the rear wheel 107, to generate a force-transferring coupling with the outer surface and to correspondingly transfer a driving force. For example, the driving unit 802, 803 may be controlled by a corresponding operation element in the handle region of the user, i.e. in the handlebar 118 or the steering rod 117.

Figure 9:
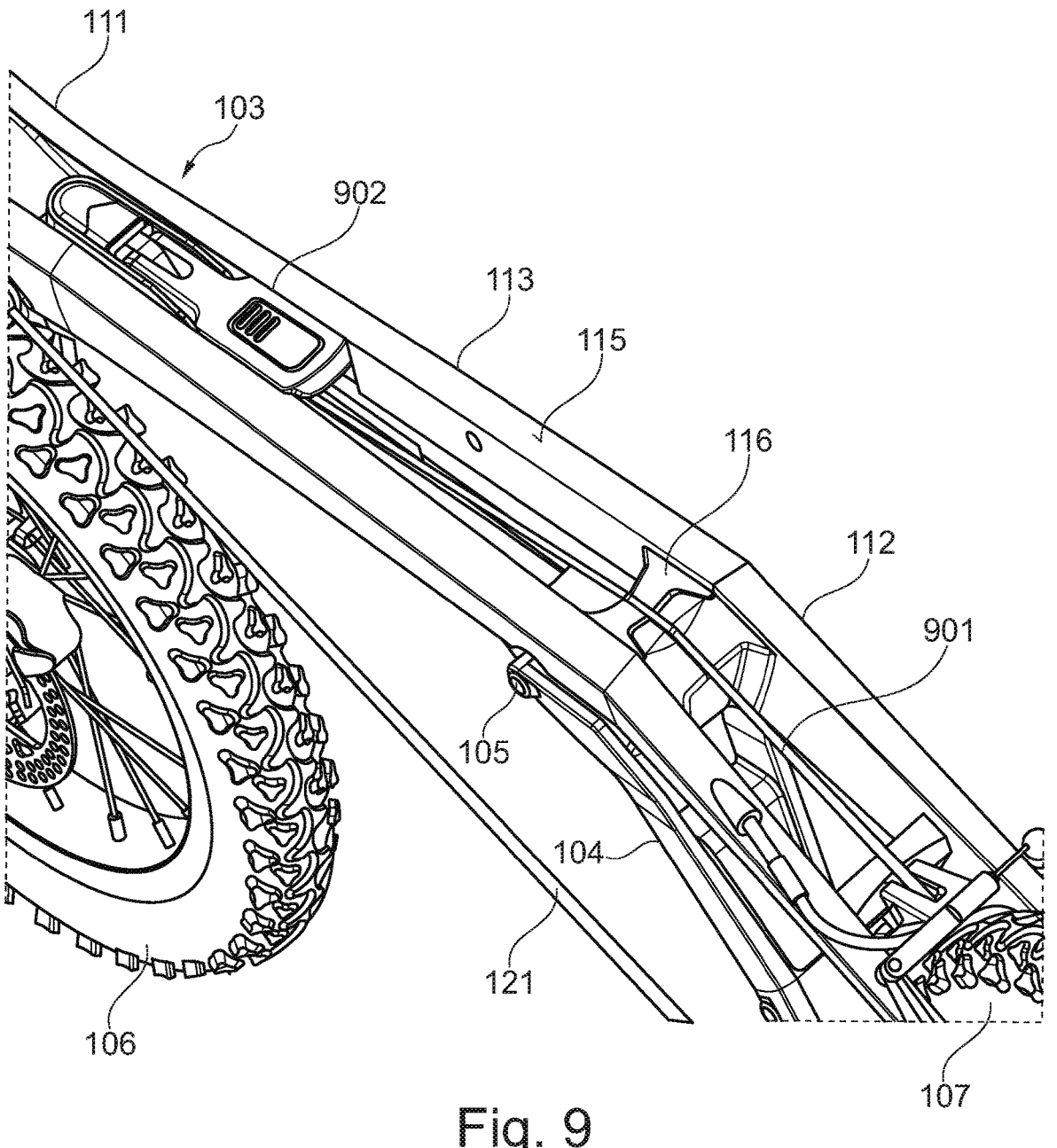
FIG. 9 shows a further exemplary embodiment of the bicycle with a third tension rope portion according to an exemplary embodiment of the present invention.

FIG. 9 shows a further exemplary embodiment of the bicycle 110. The bicycle 110 comprises the front rod portion 111, the center rod portion 113, and the rear rod portion 112. The front rod portion 111 is coupled by the hinge 103 to the center rod portion 113. The center rod portion 113 is coupled by the further hinge 116 with the rear rod portion 112. In the region of the top side 115, a third tension rope portion 901 is illustrated. The third tension rope portion 901 is coupled at least to two rod portions 111, 112, 113 which are adjacent to a hinge 103. For example, the third tension rope portion 901 is fixed to the front rod portion 111 and the center rod portion 113 and extends via the hinge 103. Alternatively, the third tension rope portion 901 may be fixed to the center rod portion 113 and the rear rod portion 112 and extends via the hinge 116. In the illustrated embodiment, the third tension rope portion 901 is fixed to the front rod portion 111 and extends via the center rod portion 113 to the rear rod portion 112 and is fixed there. In particular, the third tension rope portion 901 extends along the top side 115, i.e. at an opposing side with respect to the hinges 103, 116, in comparison to the first and the second rope tensioning portions 121, 122, which extend in the region of the bottom side 114. Thus, the third tension rope portion 901 generates a torque around the hinge 103 and/or the further hinge 116 by tension, which counteracts the torque which is generated by the first tension rope portion 121 and the second tension rope portion 123.

Therefore, with the third rope tensioning portion 901, a further stabilization of the operation position of the bicycle 100 is provided.

Furthermore, the third tension rope portion 901 may be fixed to a rod portion 111, 112, 113 by a quick release 902. In the shown embodiment, the third rope tensioning portion 901 is detachably fixed by the quick release 902 to the center rod portion 113. At the same time, besides a coupling to the center rod portion 113, the quick release is also couplable to the front rod portion 111. Thus, the quick release 901 draws the front rod portion 111 in the direction of the center rod portion 113 on the one hand and at the same time tensions the third rope tensioning portion 901, when the quick release 902 is set to a closing position (see FIG. 9).

With the quick release 902, for example a folding of the bicycle 110 may be initiated, by releasing the hinge 103 between the front rod portion 111 and the center rod portion 113 by the quick release 901, and at the same time by releasing the tension of the tension rope portion 901 between the center rod portion 113 and the rear rod portion 112 and by thereby enabling a rotation of both rod portions 112, 113 around the further hinge 116.

Figure 10:
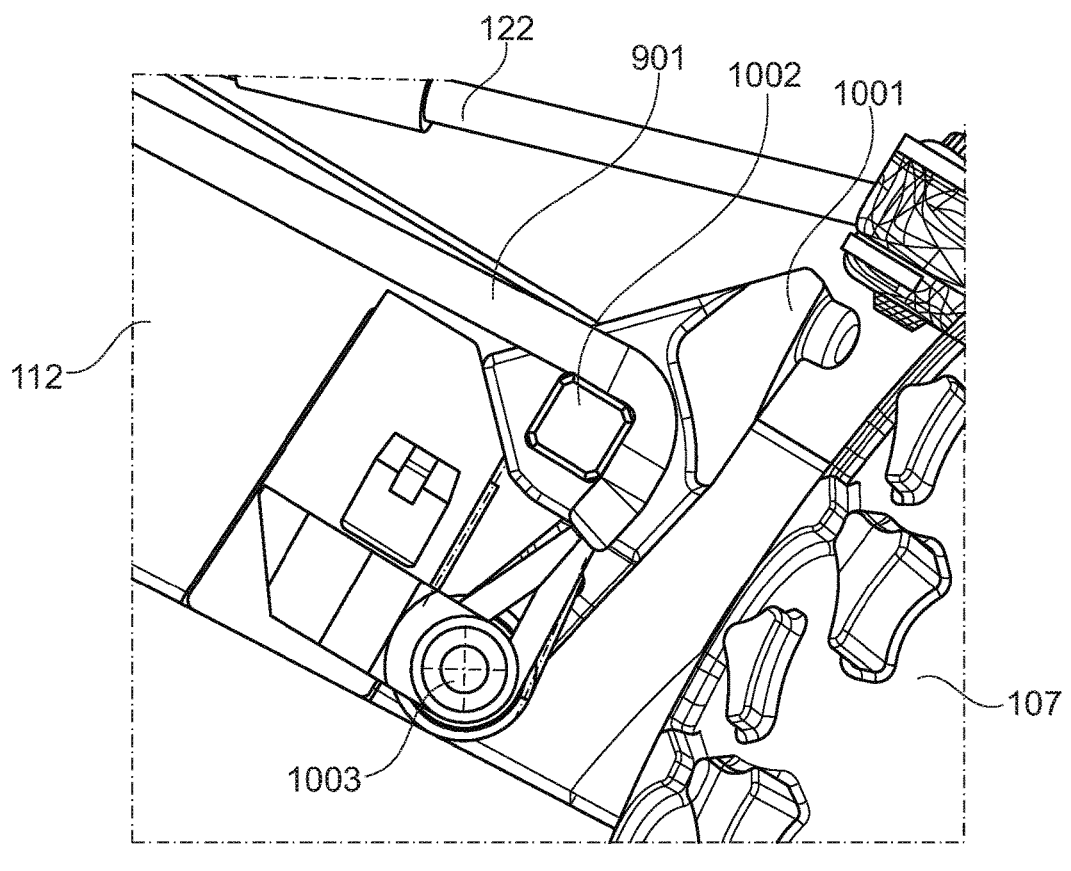
FIG. 10 shows a further exemplary embodiment of the bicycle with a third tension rope portion as an immobilizer (German: Wegfahrsperre) according to an exemplary embodiment of the present invention.

FIG. 10 shows a further exemplary embodiment of the bicycle 110 with the third rope tensioning portion 901. At the rear rod portion 112, a braking lever 1001 is pivotably fixed via a securing bolt 1003. The braking lever 1001 is pivotable such that it can pivot in the direction of the rear wheel 107 and may be coupled in a blocking position with the rear wheel 107, such that a further rotation of the rear wheel 107 is prevented or braked. The braking lever 1001 is biased in the direction of the blocking position for blocking the rear wheel 107, for example by a spring system.

In the blocking position, the braking lever 1001 can engage in a wheel profile of the rear wheel. Furthermore, by the braking lever 1001, also a braking system and/or a coupling to a braking disk may be provided. Furthermore, the third tension rope portion 901 is fixed to the braking lever 1001. The tension rope portion 901 is fixed to the braking lever 1001, such that in case of pulling the third tension rope portion 901, the braking lever 1001 is adjustable from the blocking position to a release position against the biasing force. In this release position, the rear wheel 107 can freely rotate. The third rope tensioning portion 901 may be guided around the fulcrum pin 1002, for example, and may be coupled to a securing bolt 1003 with the braking lever 1001.

When the third rope tensioning portion 901 is tensioned, for example by the quick release 902, such that it is ensured, that the bicycle 100 is in an operation position, a rotation of the rear wheel 107 is enabled and/or a blocking is eliminated. When the third rope tensioning portion 901 is not under tension and the bicycle 100 is thus not in the operation position, a rotation of the rear wheel 107 is prevented, such that a motion of the bicycle 110 is inhibited. Therefore, for example an immobilizer is enabled, such that the user can only move the bicycle 110, when a secure operation position of the bicycle 110 is adjusted.

In summary, the third tension rope portion 901 (which may be in particular formed separate from the first tension rope portion 121 and the second tension rope portion 122) is tensioned by the quick release 902, such that folding the frame and/or the support rod system 110 during driving is prevented and at the same time the immobilizer is released.

Figure 11:
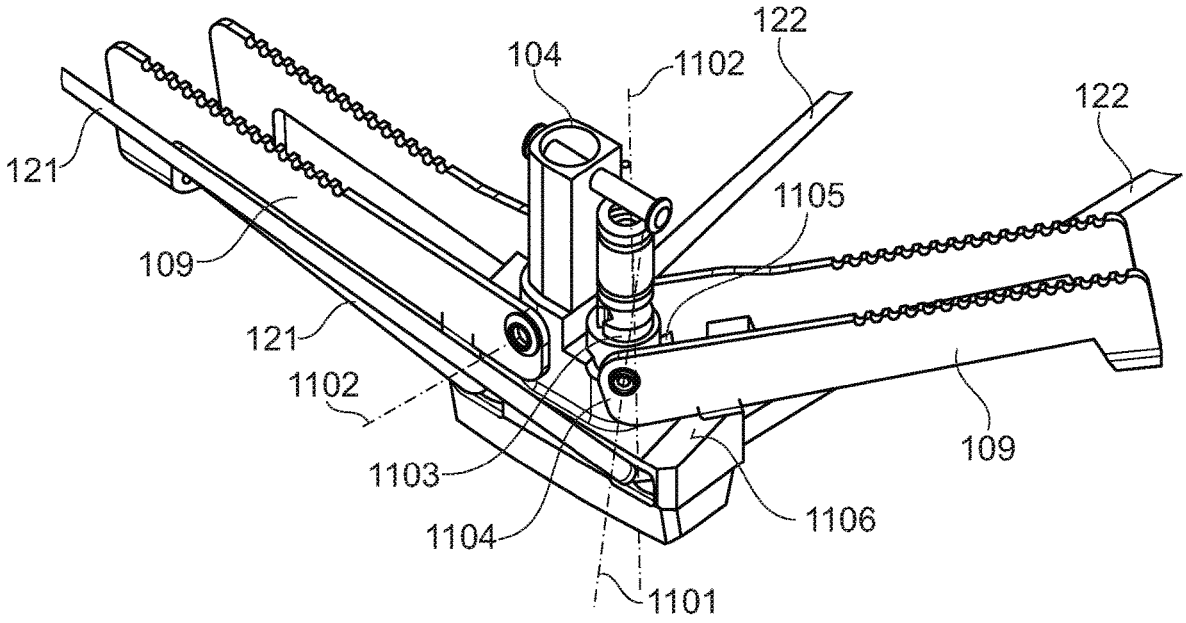
FIG. 11 shows a detailed view of the bearing of the foot pedals at the foot rod according to an exemplary embodiment of the present invention.

FIG. 11 shows a detailed view of the bearing of the foot pedals 109 at the foot rod 104. The foot pedals 109 are arranged at the support rod 104 in a manner which is pivotable around a first pivoting axis 1101, such that they are unfoldable and foldable. The first pivoting axis 1101 extends substantially within a horizontal plane, when the bicycle 110 stands on the ground, such that the foot pedals 109 are unfoldable and foldable in the direction of the ground. In this way, the foot pedals 109 may be folded downwardly in a space-saving manner, for example. In addition, the foot pedals 109 may be fixed or latched in an operation position, to serve for resting the feet of a user during the operation of the bicycle 100. Moreover, the foot pedals 109 may be further unfoldable downwardly, to function as a bicycle stand.

Furthermore, the foot pedals 109 may be coupled to the foot rod 104 in a manner which is rotatable and/or pivotable around a second pivoting axis 1102. The second pivoting axis 1102 is in particular perpendicular to the first pivoting axis 1101 and extends for example in parallel to the extension direction of the support rod 104 and/or within a vertical plane, when the bicycle 110 stands on the ground. For example, a foot pedal 109 may be fixed with a rotation pin and/or a hinge sleeve 1104 to a further hinge sleeve 1105, in particular in a manner which is pivotable around the first pivoting axis 1101. The further hinge sleeve 1105 is in turn fixed to a guiding bush 1103, for example, which is fixedly coupled with the foot rod 104. The guiding bush 1103 extends in parallel to the foot rod 104 and in particular along the first pivoting axis 1101. Therefore, the further hinge sleeve 1105 can pivot the foot pedals 109 around the second pivoting axis 1102.

The foot pedals 109 may thus be pivoted in the direction of the front wheel 106 or in the direction of the rear wheel 107. Therefore, a protection effect can be achieved, since in case of a collision of a foot pedal 109 with an obstacle during the operation of the bicycle 100, the foot pedal 109 can fold backwardly and can give way, for example.

For example, an inclined bearing surface 1106 may be provided which is arranged spaced apart from the guiding bush 1103. The bearing surface 1106 is configured such that the foot pedal 109, during pivoting around the first pivoting axis 1101 and the second pivoting axis 1102, at least partially abuts along the inclined bearing surface 1106. The inclined bearing surface 1106 is configured such that, in an operation position, the foot pedal 109 comprises a horizontal orientation, for example, and is substantially perpendicular to the foot rod 104. Furthermore, the inclined bearing surface 1106 is configured such that, during pivoting the foot pedal 109 around the second pivoting axis 1102, the foot pedal 109 is pivoted around the first pivoting axis 1101 and may thus be pivoted upwardly towards the foot rod 104, for example.

Furthermore, by the inclined ramp or the inclined bearing surface 109, by the weight force of the user, automatically a front neutral position or operation position is taken, such that the foot pedal 109 is substantially perpendicular to the foot rod 104. To force the foot pedal 109 in the neutral position, a rotation spring may further be provided, which pushes the foot pedal 109 in the direction of the neutral position also without the weight force of the user.

Figures 12, 13:
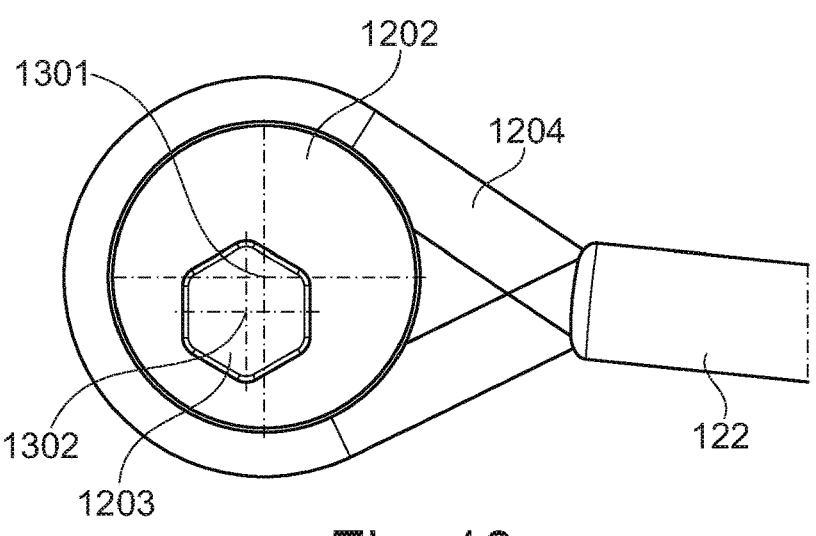
FIG. 12 shows a tensioning system for the bicycle according to an exemplary embodiment.
FIG. 13 shows a tensioning system for the bicycle with an excenter system according to an exemplary embodiment.

FIG. 12 shows a tensioning system 1201 for the bicycle 100 according to an exemplary embodiment. At a bottom and/or a lower end of the foot rod 104, for example the first rope tensioning portion 121 and the second rope tensioning portion 122 are fixed. The tension rope portions 121, 122 comprise fixing eyelets 1204, for example, which extend around a fixing pin 1202. The fixing pin 1202 is fixed by a fixing screw 1203. For example, the first rope tensioning portion 121 may be configured with respectively two parallel rope portions and the second rope tensioning portion 122 may also be configured with respectively two parallel rope portions. At the fixing pin 1202, for example respectively one rope portion of the first rope tensioning portion 121 and of the second rope tensioning portion 122 is fixed. Alternatively, for example all rope portions may be fixed to one fixing pin 1202. Alternatively, for each rope portion, a separate fixing pin 1202 may be provided.

As illustrated in FIG. 13, the fixing pin 1202 may comprise a cylindrical shape, for example, wherein the fixing screw 1203 extends in parallel to the longitudinal axis 1301 of the cylindrical shape. Hence, the round outer surface of the cylindrical fixing pin 1202 forms a bearing surface for the rope portions. In particular, the fixing screw 1203 may comprise a screw axis 1302 which extends in parallel to the longitudinal axis 1301 of the cylindrical fixing pin 1202. Furthermore, the tensioning system 1201 may be configured such that the longitudinal axis 1301 of the cylindrical fixing pin 1202 is spaced apart from the screw axis 1302 of the fixing screw 1203. Thus, an excenter system is provided, wherein in case of a rotation of the cylindrical fixing pin 1202 around the screw axis 1302, a tension or a release of the rope portions are generated which are fixed to it. Therefore, a fine adjustment of the rope tensions and/or of the first and the second rope tensioning portions 121, 122 can be achieved.

Supplementary, it should be noted, that "encompassing" does not exclude other elements or steps, and "a" or "an" does not exclude a plurality. Furthermore, it is noted, that features or steps which are described with reference to one of the above embodiments may also be used in combination with other features or steps of other above-described embodiments. Reference signs in the claims are not to be construed as limitation.

| List of reference signs: | |
| --- | --- |
| 100 | bicycle |
| 101 | front wheel region |
| 102 | rear wheel region |
| 103 | hinge |
| 104 | foot rod |
| 105 | coupling portion |
| 106 | front wheel |
| 107 | rear wheel |
| 108 | footrest region |
| 109 | foot pedal |
| 110 | support rod |
| 111 | front rod portion |
| 112 | rear rod portion |
| 113 | center rod portion |
| 114 | bottom side |
| 115 | top side |
| 116 | further hinge |
| 117 | steering rod |
| 118 | handlebar |
| 119 | steering rod hinge |
| 120 | tension rope system |
| 121 | first rope tensioning portion |
| 122 | second rope tensioning portion |
| 123 | steering hinge |
| 124 | tension lever |
| 301 | pivoting axis hinge |
| 302 | pivoting axis further hinge |
| 303 | pivoting axis steering hinge |
| 401 | pivoting axis steering rod hinge |
| 701 | bearing sleeve |
| 702 | connection portion |
| 801 | further bearing sleeve |
| 802 | driving unit |
| 803 | further driving unit |
| 804 | battery, battery packet |
| 901 | rope tensioning portion |
| 902 | quick release |
| 1001 | braking lever |
| 1002 | fulcrum pin |
| 1003 | securing bolt |
| 1101 | first pivoting axis |
| 1102 | second pivoting axis |
| 1103 | guiding sleeve |
| 1104 | hinge sleeve |
| 1105 | further hinge sleeve |
| 1106 | inclined bearing surface |
| 1201 | tensioning system |
| 1202 | fixing pin |
| 1203 | fixing screw |
| 1204 | fixing eyelet |
| 1301 | longitudinal axis |
| 1302 | screw axis |
| Fg | weight force |

The invention claimed is:

1. A bicycle for driving downhill, the bicycle comprising a front wheel region, a rear wheel region, a support rod which couples the front wheel region and the rear wheel region with each other, wherein the support rod comprises at least one hinge for unfolding and folding the support rod, wherein the support rod comprises a front rod portion between the front wheel region and the hinge and a rear rod portion between the rear wheel region and the hinge, a foot rod which is pivotably mounted with a coupling portion of the foot rod at the support rod, wherein the foot rod, at a foot portion of the foot rod which is opposing the coupling portion, comprises a footrest region for resting feet of a user of the bicycle, a tension rope system with a first rope tensioning portion and a second rope tensioning portion, wherein the first rope tensioning portion is coupled to the foot portion and the front rod portion, and the second rope tensioning portion is coupled to the foot portion and the rear rod portion, such that, when exerting a weight force on the foot portion, the foot rod is alignable in a weight force direction and the tension rope system is tensible.

2. The bicycle according to claim 1, wherein the support rod comprises a bottom side and a top side which is opposing the bottom side, wherein the front wheel region comprises a mounting portion for a front wheel, and the rear wheel region comprises a mounting portion for a rear wheel, which are arranged in a lower region of the bottom side, wherein the foot rod extends from the bottom side of the support rod in the lower region.

3. The bicycle according to claim 2, wherein the first rope tensioning portion and/or the second rope tensioning portion is guidable from the bottom side to an opposing top side of the support rod.

4. The bicycle Bicycle-according to claim 3, wherein the first rope tensioning portion extends along the top side via the hinge, such that the first rope tensioning portion is guided at the front wheel portion from the bottom side to the top side of the support rod, and is fixed on the top side to the support rod portion which, opposing to the front rod portion, abuts against the hinge, and/or wherein the second rope tensioning portion extends along the top side via the hinge, such that the second rope tensioning portion is guided at the rear rod portion from the bottom side to the top side of the support rod, and is fixed on the top side to the support rod portion which, opposing to the rear rod portion, abuts against the hinge.

5. The bicycle according to claim 2, comprising at least one of the following features:

wherein the front rod portion and the rear rod portion, in an unfolded state, define an operation position of the bicycle, wherein the hinge is configured such that, when the front rod portion and the rear rod portion are in the operation position, a folding movement of the front rod portion and of the rear rod portion in the direction of the bottom side is free, and a folding movement in the direction of the top side is blocked;

wherein the hinge is freely pivotable and is free from an arresting unit.

6. The bicycle according to claim 1, wherein the foot rod is fixed to the hinge.

7. The bicycle according to claim 1, comprising at least one of the following features:

wherein the hinge comprises a bearing sleeve which is configured such that the support rod is hinged for unfolding and folding;

wherein at least the first rope tensioning portion or the second rope tensioning portion is fixed in an interior of the bearing sleeve or at least partially extends through the bearing sleeve.

8. The bicycle according to claim 1, wherein the rope tensioning system comprises a third rope tensioning portion which extends along a top side and is fixed to the support rod at opposing sides with respect to the hinge, wherein the third rope tensioning portion is configured such that it generates a torque around the hinge by tension, opposing to the torque which is generatable by the first rope tensioning portion and the second rope tensioning portion.

9. The bicycle according to claim 8, further comprising at least one of the following features:

a quick release which detachably fixes the third rope tensioning portion to the support rod;

a braking lever which is pivotably mounted to the rear rod portion, such that the braking lever is pivotable in the direction of the rear wheel and, in a blocking position, is couplable with the rear wheel such that a further rotation of the rear wheel is preventable.

10. The bicycle according to claim 1, wherein the first rope tensioning portion and the second rope tensioning portion form portions of a common rope.

11. The bicycle according to claim 10, wherein the foot rod slidingly abuts with the foot portion against the rope.

12. The bicycle according to claim 1, wherein the first rope tensioning portion forms a first rope and the second rope tensioning portion forms a second rope which is separated from the first rope.

13. The bicycle according to claim 1, wherein, foldable foot pedals for resting feet of a user are arranged at the foot portion.

14. The bicycle according to claim 13, comprising at least one of the following features:

wherein at least one of the foot pedals is foldable downwards to function as a bicycle stand;

wherein at least one of the foot pedals is arranged at the support rod in a manner pivotable around a first pivoting axis, such that it is unfoldable and foldable, wherein at least one of the foot pedals is further arranged at the foot rod in a manner pivotable to the foot rod around a second pivoting axis, wherein the second pivoting axis is formed perpendicularly to the first pivoting axis and in parallel to an extension direction of the support rod;

wherein the foot pedal is mounted with a hinge sleeve to a further hinge sleeve in a manner pivotable around the first pivoting axis, wherein the further hinge sleeve is fixed to a guiding bush which is fixedly coupled with the foot rod, wherein the guiding bush extends in parallel to the foot rod;

wherein an inclined bearing surface for the foot pedal is formed at the foot rod, wherein the inclined bearing surface is arranged spaced apart from the guiding bush, wherein the bearing surface is configured such that the foot pedal, during pivoting around the second pivoting axis and around the first pivoting axis, at least partially abuts along the inclined bearing surface, wherein the inclined bearing surface is further configured such that, in an operation position, the foot pedal is substantially perpendicular to the foot rod, and while moving the foot pedal along the inclined bearing surface and simultaneously pivoting the foot pedal around the second rotation axis, the foot pedal pivots around the first pivoting axis.

15. The bicycle according to claim 1, further comprising at least one of the following features:

a tension lever for adjusting at least one of the following:
a rope length of the first rope tensioning portion and a rope length of the second rope tensioning portion;

wherein the support rod comprises at least one further hinge, and a center rod portion is formed between the hinge and the further hinge;

wherein a pivoting axis of the hinge and a further pivoting axis of the further hinge are not in parallel to each other.

16. The bicycle according to claim 1, wherein at least the first rope tensioning portion or the second rope tensioning portion is configured by a fixing eyelet which is arranged around a fixing pin which is fixed to the foot rod, wherein the fixing pin is fixed with a fixing screw.

17. The bicycle according to claim 16, comprising at least one of the following features:

wherein the fixing pin comprises a cylindrical shape and the fixing screw is arranged in parallel to a longitudinal axis of the cylindrical fixing pin, such that an outer surface of the cylindrical fixing pin forms a bearing surface for the rope portions of the rope tensioning portion or of the second rope tensioning portion;

wherein the fixing screw comprises a screw axis which is arranged in parallel to the longitudinal axis of the cylindrical fixing pin, wherein the longitudinal axis of the cylindrical fixing pin is formed spaced apart from the screw axis of the fixing screw.

18. The bicycle according to claim 1, wherein at the front wheel region, a steering rod is arranged pivotably around a steering axis, at which a front wheel is fixable.

19. The bicycle according to claim 18, comprising at least one of the following features:

wherein at the steering rod, at least one handlebar is arranged, which extends from the steering rod with an angle of 45° to 130°;

wherein between the steering rod and the handlebar, a steering hinge is arranged, such that the handlebar is foldable relatively to the steering rod, and the handlebar, in a folded state, is in parallel to the steering rod.

20. A method of providing a bicycle for driving downhill according to claim 1, wherein the method comprises unfolding and folding the support rod, and pivoting the foot rod, such that a weight force is exertable on the foot portion of the foot rod, to align the foot rod in the weight force direction and the tension rope system is tensioned.

* * * * *